(12) United States Patent
Graca

(10) Patent No.: US 8,555,516 B2
(45) Date of Patent: Oct. 15, 2013

(54) PIVOTING BLADE RETAINER

(75) Inventor: Gabriel Da Graca, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 507 days.

(21) Appl. No.: 12/731,934

(22) Filed: Mar. 25, 2010

(65) Prior Publication Data
US 2011/0232107 A1 Sep. 29, 2011

(51) Int. Cl.
B27B 19/02 (2006.01)
B23D 49/00 (2006.01)

(52) U.S. Cl.
USPC .............................. 30/392; 30/394; 83/699.21

(58) Field of Classification Search
USPC .................. 30/392–394, 523, 524, 337–339; 83/699.21, 698.31, 698.71, 954; 279/127, 137, 119
See application file for complete search history.

(56) References Cited

U.S. PATENT DOCUMENTS

| | | | | |
|---|---|---|---|---|
| 3,555,678 | A * | 1/1971 | Agulnick et al. | 30/393 |
| 4,106,181 | A * | 8/1978 | Mattchen | 29/450 |
| 5,322,302 | A * | 6/1994 | Quirijnen | 279/22 |
| 5,697,279 | A * | 12/1997 | Schnizler et al. | 83/698.31 |
| 5,724,742 | A | 3/1998 | Grabowski | |
| 5,848,474 | A * | 12/1998 | Fortney et al. | 30/392 |
| 5,903,983 | A * | 5/1999 | Jungmann et al. | 30/392 |
| 6,023,848 | A | 2/2000 | Dassoulas et al. | |
| 6,101,726 | A | 8/2000 | Laverick | |
| 6,233,833 | B1 | 5/2001 | Grant et al. | |
| 6,260,281 | B1 * | 7/2001 | Okumura et al. | 30/392 |
| 6,467,177 | B2 | 10/2002 | Eichberger | |
| 6,546,633 | B1 * | 4/2003 | Lovell et al. | 30/517 |
| 6,662,698 | B2 | 12/2003 | Wheeler et al. | |
| 6,810,782 | B2 * | 11/2004 | Wuensch et al. | 83/699.21 |
| 6,857,348 | B1 | 2/2005 | Mason | |
| 6,944,959 | B2 | 9/2005 | Bigden et al. | |
| 7,003,888 | B2 | 2/2006 | Bigden et al. | |
| 7,040,023 | B2 * | 5/2006 | Nemazi et al. | 30/392 |
| 7,121,008 | B2 | 10/2006 | Bone et al. | |
| 7,325,315 | B2 | 2/2008 | Bigden et al. | |
| 7,343,841 | B2 | 3/2008 | Phillips et al. | |
| 8,024,865 | B2 * | 9/2011 | Kaiser et al. | 30/392 |
| 8,046,926 | B2 * | 11/2011 | Bigden et al. | 30/392 |

FOREIGN PATENT DOCUMENTS

| | | |
|---|---|---|
| DE | 10308828 A1 | 1/2004 |
| EP | 1435273 A1 | 7/2004 |
| EP | 1518629 A1 | 3/2005 |
| GB | 2462366 A | 2/2010 |

* cited by examiner

Primary Examiner — Omar Flores Sanchez
(74) Attorney, Agent, or Firm — Harness, Dickey & Pierce, P.L.C.

(57) ABSTRACT

A saw blade clamping arrangement for a power can include a clamp support base that is operatively coupled for movement with a drive shaft and has a first and a second, saw blade slots. First and second locking members can be operatively associated with the clamp support base and be movable between a locked position that selectively locks the blade in one of the corresponding first and second slots, and an unlocked position that releases the blade. A release member can rotate to cause the first cam surface to urge the first locking member at least partially into the first slot and the second cam surface to concurrently urge the second locking member at least partially into the second slot. In another configuration, the release member can alternatively urge the first or second locking member into the respective slots.

20 Claims, 6 Drawing Sheets

PIVOTING BLADE RETAINER

FIELD

The present disclosure relates in general to power tools. In particular, the present disclosure relates to a pivoting blade retainer for power tools having a saw blade mounted to a shaft for reciprocating cutting motion.

BACKGROUND

This section provides background information related to the present disclosure which is not necessarily prior art.

Power reciprocating saws including jigsaws and other reciprocating saws are generally referred to in the trade as "recip" saws. These saws incorporate reciprocating drive shafts. The drive shafts can operate to drive generally linear saw blades along a predetermined path so as to provide one of a rectilinear or orbital cutting action.

In a conventional manner, the saw blades used with such power tools can be attached to the reciprocating drive shafts through a blade holder having a slot for receiving the saw blade and a set screw which can be received in a hole in the blade. The blade can be clamped in place relative to the reciprocating drive shaft through tightening of the set screw. While this conventional manner of saw blade attachment has proven to be generally satisfactory and commercially successful, it is nonetheless desirable to provide an improved blade clamping mechanism.

SUMMARY

This section provides a general summary of the disclosure, and is not a comprehensive disclosure of its full scope or all of its features.

A saw blade clamping arrangement for a power tool is disclosed. The saw blade clamping arrangement can be operatively configured for use with a power tool that includes a housing and a drive shaft mounted for reciprocating motion relative to the housing and having a longitudinal drive axis. A saw blade can be releasably interconnected with the drive shaft for reciprocating motion along a longitudinal axis. The saw blade clamping arrangement can include a clamp support base that is operatively coupled for movement with the drive shaft and has a first and a second, saw blade slots. First and second locking members can be operatively associated with the clamp support base and be movable between a locked position that selectively locks the blade in one of the corresponding first and second slots, and an unlocked position that releases the blade.

A release lever can have a user engagement portion, a first cam surface and a second cam surface. The release lever can be mounted relative to the clamp support base for rotational movement about a pivot axis. The release member can be movable between a first position that corresponds to the locked position and a second position that corresponds to the unlocked position. Rotation of the release lever from the second position to the first position can cause the first cam surface to urge the first locking member at least partially into the first slot and the second cam surface to concurrently urge the second locking member at least partially into the second slot.

According to additional features, the release lever can be unitary. A pivot pin can be coupled to the support base that defines a pivot axis that the release member rotates about. The pivot pin can be coupled to the support base at a location that can be equidistant and/or in line with the first and second slots. A biasing member can be operably associated with the clamp support base that urges the release lever into the first position.

According to other features, the first and second cam members can directly contact the first and second locking members in the locked position. The first and second locking members can be spherically shaped. The release lever can include first and second concave surfaces that align with and nestingly receive the first and second locking members in the unlocked position. The clamp support base can define a first and a second cavity that accommodate the first and second locking members, respectively. The clamp support base can define a first and a second groove that oppose the respective first and second cam surfaces of the release lever. The release lever can be configured to rotate through substantially about forty-five degrees of motion around the pivot axis between the first position and the second position.

According to additional features, the release lever can be configured to alternatively lock either the first or the second locking member in the locked position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides an improved saw blade clamping arrangement for a power tool. While shown throughout the drawings in one embodiment for a saw blade clamping arrangement specifically adapted for a reciprocating saw, those skilled in the art will appreciate that the disclosure is not so limited in scope. In this regard, the various teachings of the present disclosure will be understood to be readily adaptable for use with any power tool incorporating one or more reciprocating cutting members (e.g., reciprocating saws, jigsaws, various surgical saws and culinary knives, etc.).

Figure 1:
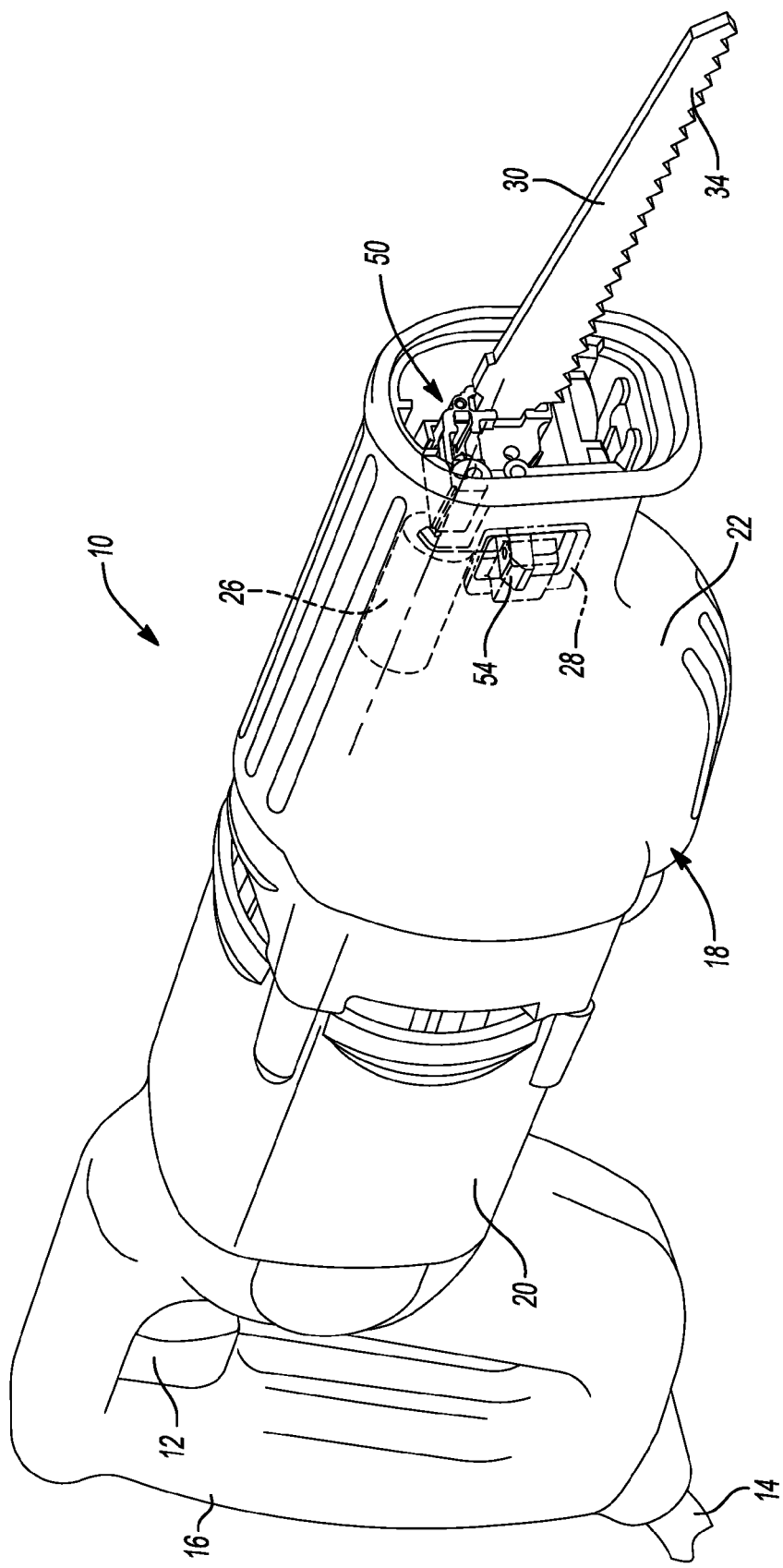
FIG. 1 is a front perspective view of an exemplary reciprocating saw that incorporates a clamping arrangement constructed in accordance to the present teachings, the saw blade clamping arrangement shown operatively associated with a saw blade in a first orientation.

With reference now generally to the drawings in which identical or equivalent elements have been denoted with like reference numerals, and specifically to FIGS. 1-4 thereof, an exemplary power tool is shown and generally identified at reference numeral 10. The exemplary power tool 10 embodies the teachings of the present disclosure and is illustrated in FIG. 1 as a power reciprocating saw. In a conventional manner, the power reciprocating saw 10 can be powered by a motor (not shown) that can be actuated by a trigger switch 12. The delivery of electrical energy to the motor through a power cord (partially shown at reference numeral 14) can be controlled by the trigger switch 12. In other examples, the power tool 10 can be alternatively powered by a battery.

In the exemplary embodiment illustrated, the power tool 10 can include a handle portion 16 that carries the trigger switch 12. The power tool 10 can also include a housing 18 that has a centrally located motor housing portion 20 and a forwardly located gear case housing portion 22. The power tool 10 can further include a drive shaft 26 that partially extends within a drive shaft channel (not specifically shown) and operatively connected with a drive mechanism (not specifically shown) housed within the gear case housing portion 22. The inner connection between the drive mechanism and the drive shaft 26 can be in any manner well known in the art. The drive shaft 26 can be mounted for reciprocating motion generally along a longitudinal axis defined by the power tool 10. A button or cover 28 can be arranged on the gear case housing portion 22 that communicates with a release lever as will become appreciated from the following discussion.

The drive shaft 26 can be adapted to cooperate with a cutting member, such as a saw blade 30 (see also FIG. 5) for driving the saw blade 30 back and forth in a cutting motion along a rectilinear path. In this regard, the reciprocating drive shaft 26 can be formed to include a transversely extending aperture for receiving a drive pin (not specifically shown). Additional description of the drive shaft 26 and its operation relative to other components of the power tool 10 may be found in commonly owned U.S. Pat. No. 7,325,315, which is expressly incorporated herein by reference.

Figure 5:
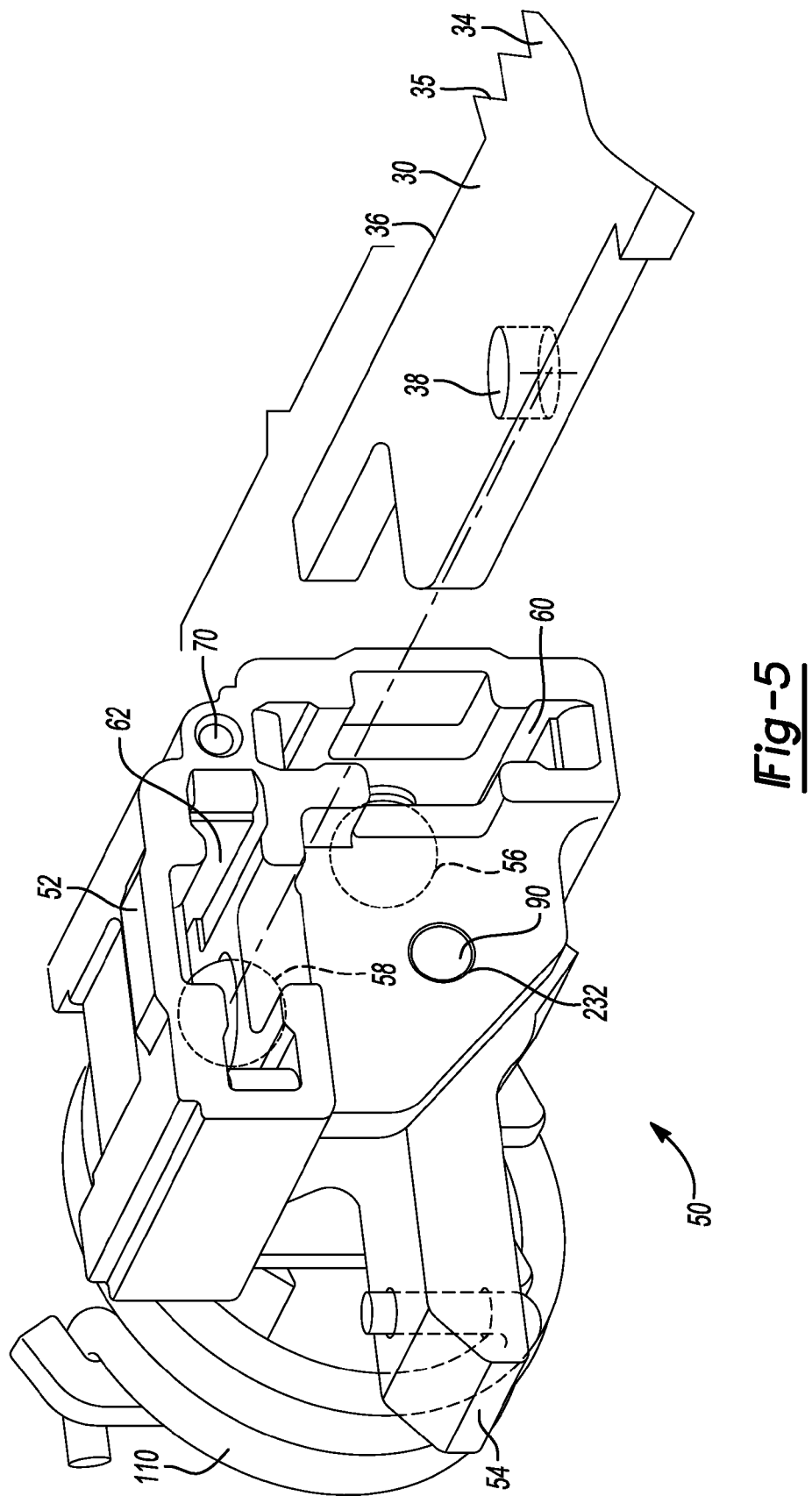
FIG. 5 is an exploded perspective view of the saw blade clamping arrangement of FIG. 1 and shown with an exemplary saw blade.

With brief reference now to FIG. 5, the exemplary saw blade 30 can conventionally include a forwardly located cutting portion 34 that has teeth 35 and is integrally formed with a rearwardly located mounting portion 36. In a manner well known in the art, an aperture or blade hole 38 can be formed in the mounting portion 36 of the saw blade 30. As will become appreciated from the following discussion, the aperture 38 is operable to selectively receive locking members to secure the position of the saw blade 30 relative to the power tool 10.

Returning now to FIGS. 1-4, the power tool 10 of the present disclosure further includes a clamping arrangement 50 for releasably maintaining the saw blade 30 in operative connection with the reciprocating drive shaft 26. The saw blade clamping arrangement 50 according to the present disclosure can be operable to accommodate the saw blade 30 in various orientations. As will become appreciated below, this aspect of the present disclosure can provide a user of the power tool 10 with improved flexibility to avoid obstacles that may be encountered during cutting operations.

Figure 2:
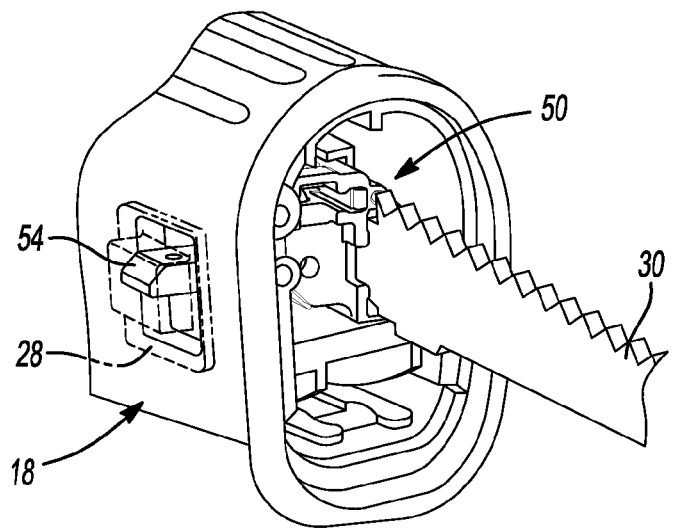
FIG. 2 is a perspective view illustrating a portion of the exemplary reciprocating saw of FIG. 1, the saw blade clamping arrangement shown operatively associated with the saw blade in a second orientation.
Figure 3:
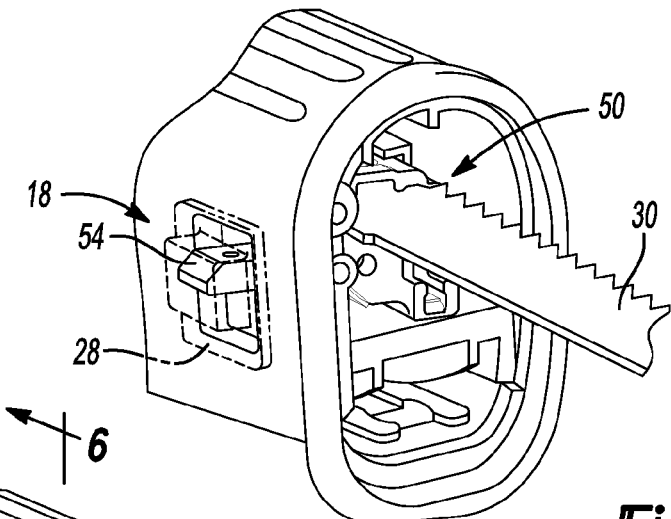
FIG. 3 is a perspective view illustrating a portion of the reciprocating saw of FIG. 1, the saw blade clamping arrangement shown operatively associated with the saw blade in a third orientation.
Figure 4:
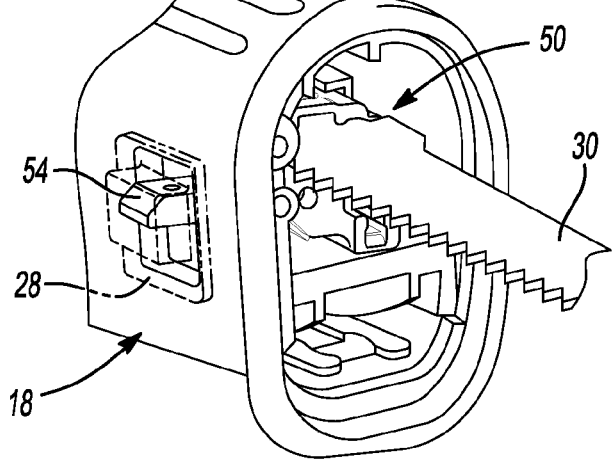
FIG. 4 is a perspective view illustrating a portion of the reciprocating saw of FIG. 1, the saw blade clamping arrangement shown operatively associated with the saw blade in a fourth orientation.

Prior to addressing the specific construction and operation of the clamping arrangement 50, a brief description of the various saw blade orientations will be explained. FIG. 1 illustrates a first cutting position in which the blade 30 can be disposed in a generally vertical plane and the teeth 35 of the blade 30 can be oriented downward. The blade orientation as illustrated in FIG. 1 is typical of known reciprocating saws. As illustrated in FIG. 2, a second cutting position is shown in which the blade 30 can again be oriented in a generally vertical plane. In the second cutting position, the teeth 35 of the blade 30 can be oriented upward. Turning now to FIG. 3, a third cutting position in which the blade 30 can be oriented in a generally horizontal plane is shown. In the third position, the cutting position is perpendicular as compared to the first and second cutting positions. As illustrated in FIG. 4, a fourth cutting position is shown in which the blade 30 can again be oriented in a generally horizontal plane. In the fourth cutting position, the teeth 35 of the blade 30 can be oriented in a generally opposite direction to the third cutting position shown in FIG. 3.

With additional reference now to FIG. 5, the clamping arrangement 50 can generally include a clamp support base 52, a pivoting blade retainer or release lever 54, a first locking member 56 and a second locking member 58. According to the exemplary embodiment illustrated, the first and second locking members 56 and 58 can be in the form of spherical balls. Other configurations are contemplated such as, but not limited to cylindrical, oval, oblong and pin-shaped. The first and second locking members 56 and 58 can be formed of rigid material, including metal, such as stainless steel for example. The clamp support base 52 can define a first or vertical slot 60 for receiving the blade 30 in either the first cutting position (as shown in FIG. 1) or the second cutting position (as shown in FIG. 2). The clamp support base 52 can further include a second or horizontal slot 62. The second slot 62 can receive the saw blade 30 in the third cutting position (FIG. 3) or the fourth cutting position (FIG. 4). Notably, the second slot 62 can be spaced relative to the first slot 60. In this manner, the saw blade 30 can be off-center relative to the drive shaft 26 and positioned proximate to a sidewall of the tool housing 18. Such positioning of the saw blade 30 closer to the sidewall of the tool housing 18 can facilitate a flush cutting of a workpiece with the saw blade 30. Furthermore, the first slot 60 and the second slot 62 can be arranged in a non-intersecting manner on the clamp support base 52. Other configurations such as intersecting are contemplated.

Figure 6:
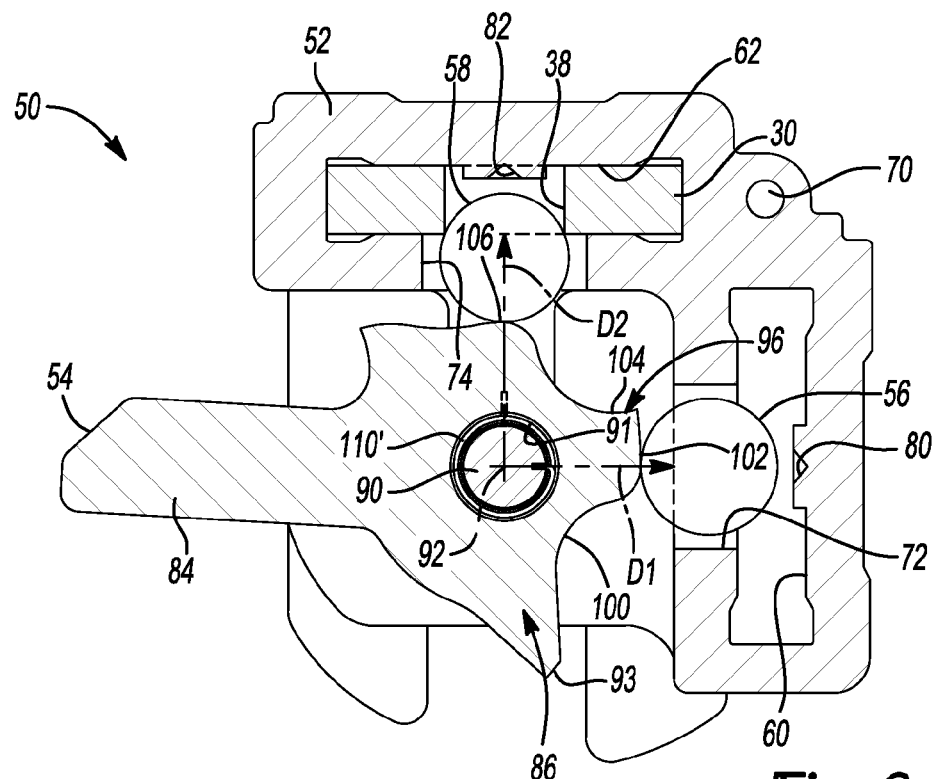
FIG. 6 is a cross-sectional view of the saw blade clamping arrangement of FIG. 5 and taken along lines 6-6, the saw blade clamping arrangement shown with a release lever in the closed position.
Figure 7:
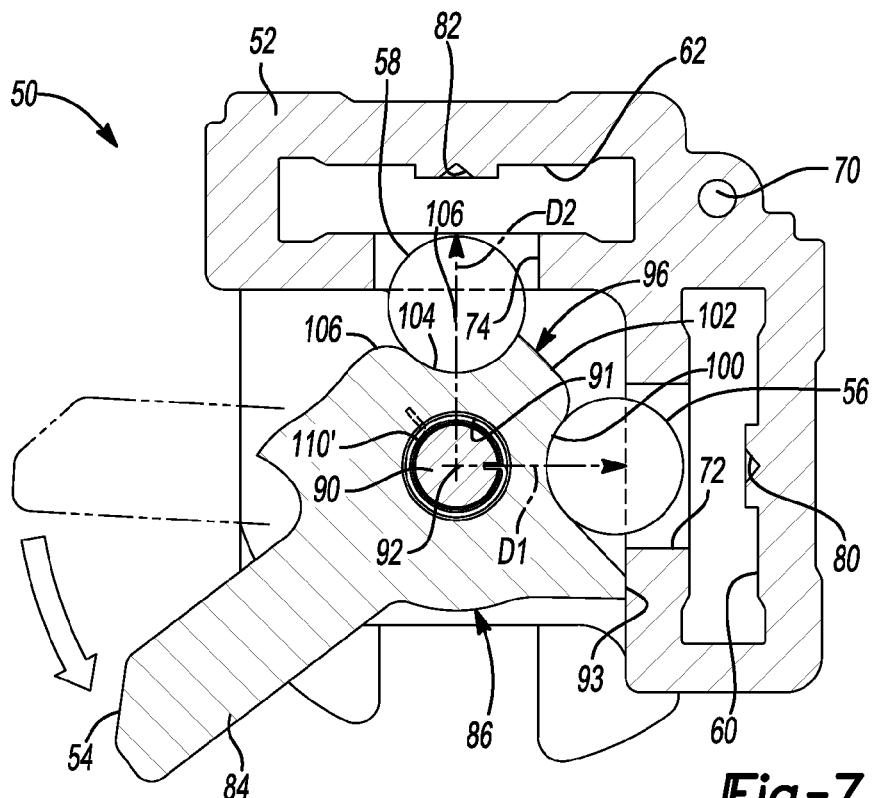
FIG. 7 is a cross-sectional view of the saw blade clamping arrangement of FIG. 6 and shown with the release lever in the open position.

Briefly, with continued reference to FIG. 5 and additional reference to FIGS. 6 and 7, the release lever 54 of the saw blade clamping arrangement 50 can be operable to rotate between a first or closed position (FIG. 6) where the first and second locking members 56 and 58 are urged into the first and second slots 60 and 62, respectively, for engagement with a saw blade 30. For illustrative purposes, the saw blade 30 is shown secured relative to the second cavity 62 however it is appreciated that the saw blade can similarly be positioned in the first cavity 60. The release lever 54 can be selectively rotated to an unlocked or open position where the first and second locking members 56 and 58 are permitted to retract away from the first and second slots 60 and 62 in a direction toward the release lever 54, such that the blade 30 can be selectively removed from the first or second slot 60 and 62.

Figure 10:
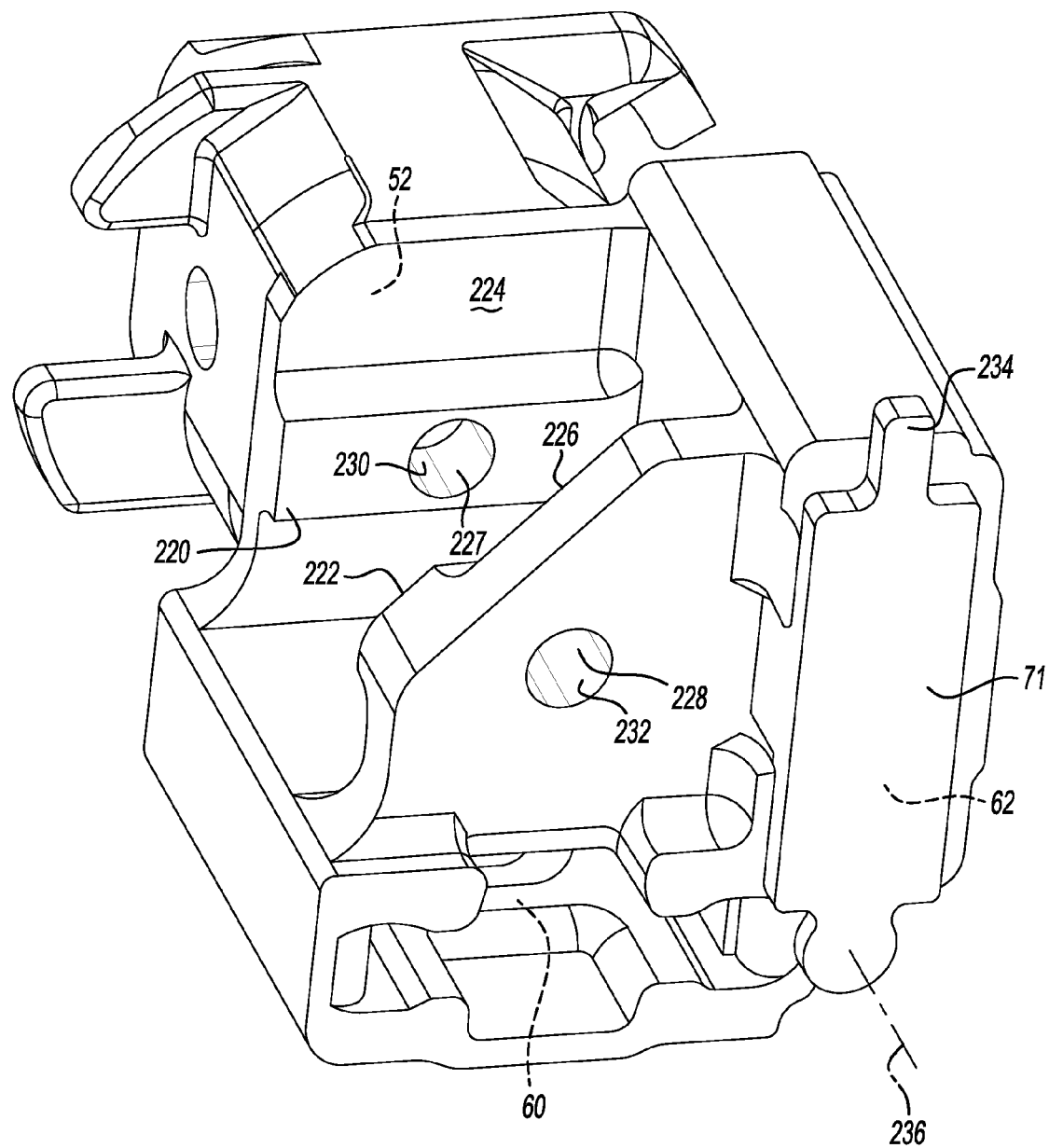
FIG. 10 is a front perspective view of the clamp support base.

The clamp support base 52 can include a mounting bore 70 that selectively receives a fastener or other mounting hardware for coupling a dust cover 71 (FIG. 10). The clamp support base 52 can further include a first locking ball cavity 72 and a second locking ball cavity 74. The first and second locking ball cavities 72 and 74 can be arranged for at least partially accommodating the first and second locking members 56 and 58, respectively. A first groove 80 can be formed on the clamp support base 52 adjacent to the first slot 60. The first groove 80 can oppose the first locking member 56 when release lever 54 is in the closed position (FIG. 6). A second groove 82 can be formed in the clamp support base 52 that opposes the second locking member 58 when the release lever 54 is in the locked position (FIG. 6).

The release lever 54 can generally include a user interaction portion 84 and a locking portion 86. The release lever 54 can be fixedly mounted around a pin 90 that is rotatably coupled to the clamp support base 52. The release lever 54 can define a passage 91 that receives the pin 90. In general, the release lever 54 can rotate with the pin 90 around an axis 92 defined by the pin 90 between the closed position (FIG. 6) and the open position (FIG. 7). In other examples, the release lever 54 can rotate around the pin 90 that is fixed relative to the clamp support base 52. In the example shown, the release lever 54 can rotate about forty-five degrees around the pin 90 between the closed and open positions. Other configurations are contemplated. According to one example, the release lever 54 can be a unitary piece formed of rigid material, such as metal including stainless steel for example. A positive stop 93 can be provided on the release lever 54 that engages a surface of the clamp support base 52 (FIG. 7) to preclude over-rotation in the counterclockwise direction as viewed in FIG. 7. A similar positive stop (not specifically shown) can be provided to preclude over-rotation in the clockwise direction.

The locking portion 86 of the release lever 54 will now be described in greater detail. The locking portion 86 can have an engaging surface 96 that collectively includes a first concave surface 100, a first cam surface 102, a second concave surface 104 and a second cam surface 106. In one example, the first and second concave surfaces 100 and 104 can substantially match the outer profile of the first and second locking members 56 and 58, respectively. Notably, a smooth arcuate transition can be provided along the engaging surface 96 from the first and second concave surfaces 100 and 104 to the first and second cam surfaces 102 and 106, respectively. The smooth arcuate transitions can facilitate a smooth and uniform engagement of the release lever 54 with the first and second locking members 56 and 58 during rotation of the release lever 54 between the closed and open positions.

As illustrated in FIG. 6, with the release lever 54 in the closed position the first cam surface 102 of the locking portion 86 is substantially aligned for engagement with the first locking member 56 and the second cam surface 106 is substantially aligned for engagement with the second locking member 58. In this regard, the respective first and second cam surfaces 102 and 106 can operatively urge the first and second locking members 56 and 58 at least partially into the respective first and second slots 60 and 62 in the closed position. With the first and second locking members 56 and 58 urged at least partially into the respective first and second slots 60 and 62, the first and second locking members 56 and 58 can engage the blade 30, such as at the blade hole 38, to lock the blade 30 to the clamp support base 52 at the first or second slot 60, 62. In one example, a biasing member 110 can be arranged for urging the release level 54 into the closed position illustrated in FIG. 5. A biasing member 110' (FIGS. 6 and 7) can additionally or alternatively be arranged around the pin 90 for urging the release lever 54 into the closed position.

With specific reference now to FIGS. 6 and 7, rotation of the release lever 54 from the locked position (FIG. 6) into the unlocked position (FIG. 7) will be described. Rotation of the release lever 54 in the counterclockwise direction as viewed in FIG. 7 can align the first and second concave surfaces 100 and 104 with the respective first and second locking members 56 and 58 and allow the respective first and second locking members 56 and 58 to at least partially withdraw from the first and second slots 60 and 62. Concurrently, the first and second locking members 56 and 58 can be permitted to nestingly locate against the first and second concave surfaces 100 and 104 of the locking portion 86 of the release lever 54.

As can be appreciated, with the first and second locking members 56 and 58 retracted away from the first and second slots 60 and 62, the saw blade 30 can be removed from the first or second slot 60, 62. It will also be appreciated that manual withdrawal of the saw blade 30 can further encourage the first and second locking members 56 and 58 to move toward the first and second concave surfaces 100 and 104 by a ramping action of the first and second locking members over the saw blade 30 at the blade hole 38. According to the exemplary embodiment, a distance D1 measured between the pivot axis 92 and the first slot 60 can be equidistant and/or in line with a second distance D2 measured between the pivot axis 92 and the second slot 62. Such a relationship can facilitate uniform force transmission onto the first and second locking members 56 and 58 during rotation of the release lever 54 to the closed position.

Rotation of the release lever 54 from the open position (FIG. 7) back to the closed position (FIG. 6) will be briefly described. As the release lever 54 rotates in a clockwise direction as viewed from FIG. 7, the first locking member 56 transitions from engagement with the first concave surface 100 into engagement with the first cam surface 102. As identified above, a transition from the first concave surface 100 to the first cam surface 102 along the engaging surface 96 can be a smooth arcuate surface that encourages a smooth ramping movement along the outer surface of the first locking member 56. Similarly, the second locking member 58 transitions along the engaging surface 96 from engagement with the second concave surface 104 to the second cam surface 106. Again, the transition from the second concave surface 104 to the second cam surface 106 on the locking portion 86 of the release lever 54 can include a generally smooth and arcuate surface that promotes a smooth ramping engagement with the second locking member 58. Rotation back to the closed position is further encouraged by the biasing force of the biasing member 110 (and/or 110').

The blade clamping arrangement 50 according to the present teachings can be particularly robust over other blade clamps. More particularly, the blade clamp arrangement 50 can require only a rotational motion of a release lever that cams retaining balls into contact with a blade. Secondary components, such as sliders, etc. and/or additional motions, such as linear translations etc. are not necessary. In this regard, the blade clamping arrangement 50 can be less prone to binding up such as a result of debris build up, contamination or rust for example.

Figure 8:
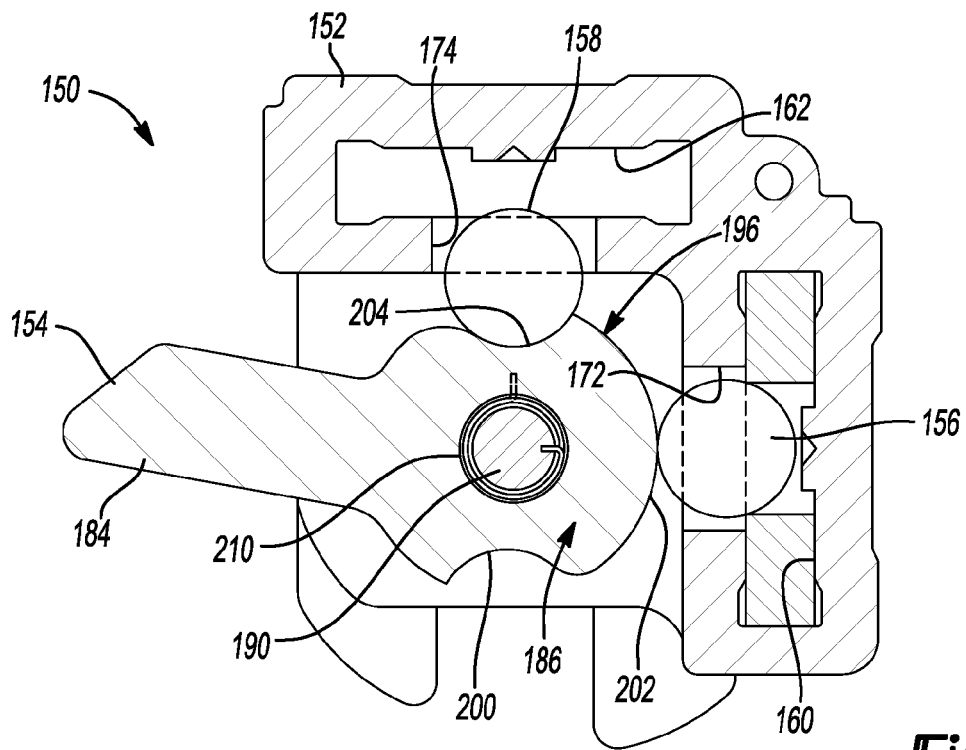
FIG. 8 is a cross-sectional view of a saw blade clamping arrangement according to additional features and shown with a release lever in a first closed position.
Figure 9:
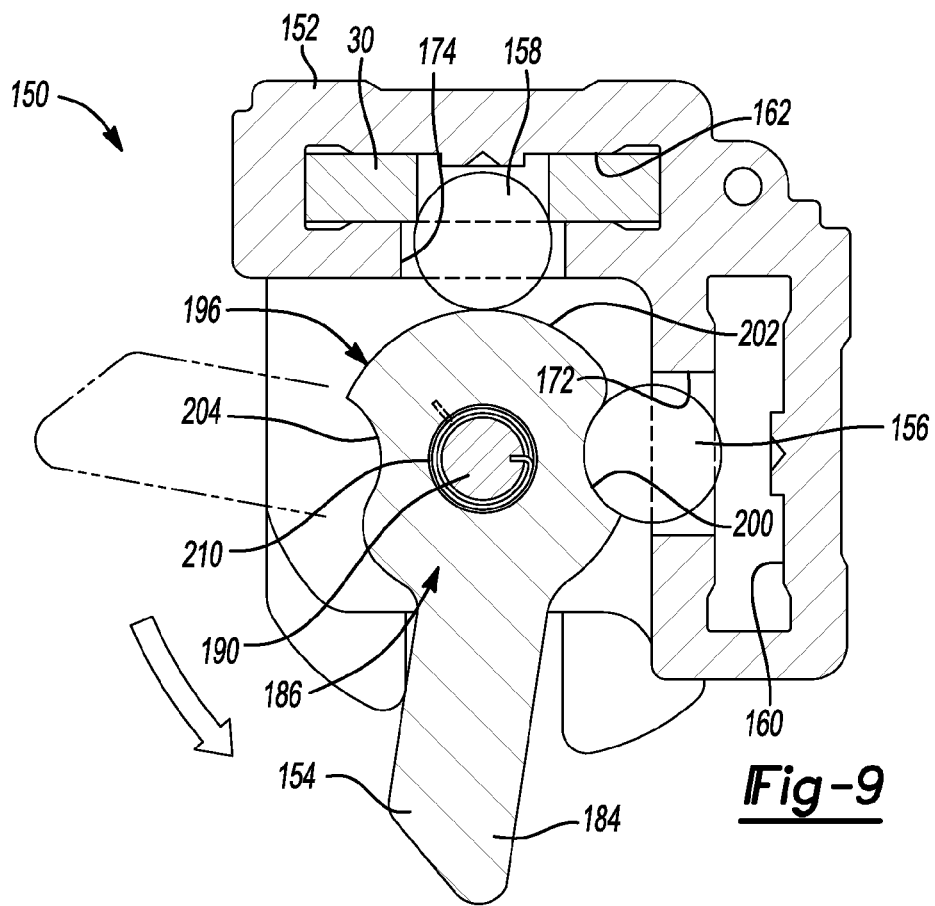
FIG. 9 is a cross-sectional view of the saw blade clamping arrangement of FIG. 8 and shown with the release lever in a second closed position.

Turning now to FIGS. 8 and 9, a clamping arrangement 150 constructed in accordance to additional features of the present teachings will be shown. Unless otherwise described herein, the clamping arrangement 150 can be constructed similar to the clamping arrangement 50 described above and shown in FIGS. 6 and 7. In this regard, like features have been identified with similar reference numerals increased by 100. The clamping arrangement 150 can generally include a clamp support base 152, a pivoting blade retainer or release lever 154, a first locking member 156 and a second locking member 158. According to the exemplary embodiment illustrated, the first and second locking members 156 and 158 can be in the form of spherical balls however other shapes such as described above with respect to the first and second locking members 56 and 58 are contemplated.

The clamp support base 152 can define a first or vertical slot 160 receiving the blade 30 in either the first cutting position (as shown in FIG. 1) or the second cutting position (as shown in FIG. 2). The clamp support base 152 can further include a second or horizontal slot 162. The second slot 162 can receive the saw blade 30 in the third cutting position (FIG. 3) or the fourth cutting position (FIG. 4). As will become appreciated from the following discussion, the release lever 154 is movable between a first closed position as shown in FIG. 8 that clamps a saw blade 30 within the vertical cut slot 160 and a second closed position as illustrated in FIG. 9 that clamps the saw blade 30 in the horizontal cut slot 162.

With specific reference now to FIG. 8, the release lever 154 of the saw blade clamping arrangement 150 can be operable to rotate between the first closed position where the first locking member 156 is urged into the first slot 160 for engagement with a saw blade 30. While the release lever 154 is urging the first locking member 156 into locking engagement with the saw blade 30 in the first slot 160, the second locking member 158 is in a retracted position relative to the horizontal slot 162. With specific reference to FIG. 9, with the release lever 154 rotated into the second closed position, the first locking member 156 is retracted from the vertical slot 160 and the second locking member 158 is urged into the second slot 162 for engagement with a saw blade 30.

The clamp support base 152 can further include a first locking ball cavity 172 and a second locking ball cavity 174. The first and second locking ball cavities 172 and 174 can be arranged for accommodating at least portions of the first and second locking members 156 and 158, respectively. The release lever 154 can generally include a user interaction portion 184 and a locking portion 186. The release lever 154 can be fixedly mounted around a pin 190 that is rotatably coupled to the clamp support base 152. In general, the release lever 154 can rotate with the pin 190 between the first closed position (FIG. 8) and the second closed position (FIG. 9). In other configurations, the release lever 154 can rotate around the pin 190 that is fixed relative to the clamp support base 152. In the example shown, the release lever 154 can rotate about ninety degrees with the pin 190 between the first and second closed positions. Other configurations are contemplated.

The locking portion 186 of the release lever 154 will now be described in greater detail. The locking portion 186 can have an engaging surface 196 that collectively includes a first concave surface 200, a cam surface 202, and a second concave surface 204. In one example, the first and second concave surfaces 200 and 204 can substantially match the outer profile of the first and second locking members 156 and 158, respectively. A smooth, arcuate transition can be provided along the engaging surface 196 from the first and second concave surfaces 200 and 204 to the cam surface 202. The smooth arcuate transition can facilitate a smooth and uniform engagement of the release lever 154 with the first and second locking members 156 and 158 during rotation of the release lever 154 between the first and second closed positions.

With particular reference now to FIG. 8, with the release lever 154 in the first closed position, the cam surface 202 of the locking portion 186 is substantially aligned for engagement with the first locking member 156 and the second concave surface 204 is substantially aligned for engagement with the second locking member 158. In this regard, the cam surface 202 can operatively urge the first locking member 156 at least partially into the first slot 160 in the first closed position. With the first locking member 156 urged at least partially into the first slot 160, the first locking member 156 can engage the blade 30, such as at the blade hole 38, to lock the blade 30 to the clamp support base 152 at the first slot 160.

With reference now FIG. 9, with the release lever 154 in the second closed position, the cam surface 202 of the locking portion 186 is substantially aligned for engagement with the second locking member 158 and the first concave surface 200 is substantially aligned for engagement with the first locking member 156. In this regard, the cam surface 202 can operatively urge the second locking member 158 at least partially into the second slot 162 in the second closed position. With the second locking member 158 urged at least partially into the second slot 162, the second locking member 158 can engage the blade 30, such as at the blade hole 38, to lock the blade 32 to the clamp support base 152 at the second slot 162.

Turning now to FIG. 10, additional features of the clamp support base 52 will be described. While the foregoing additional features are described with respect to the clamp support base 52, they may also be incorporated in the clamp support base 152. For illustrative purposes, the release lever 54 and biasing member 110 have been removed. As shown, a pair of opposing rails 220 and 222 can extend from walls 224 and 226, respectively on the clamp support base 52. The walls 224 and 226 can have arcuate surfaces 227 and 228 that define apertures 230 and 232, respectively that support the pin 90 (FIGS. 6 and 7). A width of the release lever 54 can be configured to slidably engage respective surfaces of the opposing rails 220 and 222.

In one advantage, friction can be reduced on the release lever 54 as it may only slidably engage the reduced surface area of the rails 220 and 222 as opposed to the entire surface of the walls 224 and 226. Furthermore, the rails 220 and 222 can encourage dust and debris to be scraped or otherwise removed from the outer surfaces of the release lever 54 during rotation of the release lever 54 with the pin 90. In this regard, the rails 220 and 222 can minimize the surface area that can be contaminated by dust and debris. Moreover, the pin 90 can rotate around the arcuate surfaces 227 and 228 defining the apertures 230 and 232 (rather than the release lever 54 rotating around the pin 90). As the collective surface area of the surfaces 227 and 228 is relatively smaller than a surface area defined by the passage 91 (FIG. 6) through the release lever 54, a reduced friction can be realized during rotation of the release lever 54. In addition, the friction areas (i.e., the surfaces of the opposing rails 220 and 222) that slidably engage the release lever 54 and the arcuate surfaces 227 and 228 that slidably engage the pin 90 are near the center of rotation of the release lever 54 (i.e., axis 92). In this regard, the moment arm created by the release lever 54 around the axis 92 can offer a user a mechanical advantage that can overcome the friction described above with minimal resistance during rotation of the release lever 54.

The dust cover 71 is shown covering the second slot 62. The dust cover 71 can include a protruding tab 234 for user engagement during rotation. The dust cover 71 can be rotated about a pivot axis 236 to cover an entrance to the first slot 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A saw blade clamping arrangement for a power tool including a housing, a drive shaft mounted for motion relative to the housing and having a longitudinal drive axis, and a saw blade that is adapted to be releasably interconnected with the drive shaft via the saw blade clamping arrangement, the saw blade clamping arrangement comprising:
   a clamp support base having first and second saw blade slots;
   a first spherical locking member operatively associated with the clamp support base and movable between a locked position that selectively locks the blade in the first slot and an unlocked position that releases the blade;
   a second spherical locking member operatively associated with the clamp support base and movable between a locked position that selectively locks the blade in the second slot and an unlocked position that releases the blade;
   a pivot pin mounted to the clamp support base and supported by opposing walls of the support base; and
   a release lever having a user interaction portion, a first cam surface and a second cam surface, the release lever positioned intermediate the opposing walls of the clamp support base and rotatably coupled around a pivot axis defined by the pivot pin wherein the release lever is movable between a first position, corresponding to locating the first and second locking members in their locked positions and a second position, which is associated with locating the first and second locking members in their unlocked positions;
   wherein in the first position, the first cam surface urges the first locking member at least partially into the first slot and the second cam surface urges the second locking member at least partially into the second slot to engage the blade in the locked position.

2. The saw blade clamping arrangement of claim 1 wherein the pivot pin is rotatably coupled to the support base at a location that is at least one of in line with and equidistant from the first and second slots.

3. The saw blade clamping arrangement of claim 2, further comprising a biasing member operably associated with the clamp support base and that urges the release lever into the first position.

4. The saw blade clamping arrangement of claim 3 wherein the biasing member is coupled to the release lever at a location closer to a terminal edge of the release lever and farther from the pivot pin.

5. The saw blade clamping arrangement of claim 3 wherein the release lever includes first and second concave surfaces that align with and nestingly receive the first and second spherical locking members in the unlocked position.

6. The saw blade clamping arrangement of claim 5 wherein the clamp support base defines a first and a second cavity that accommodate the first and second spherical locking members, respectively.

7. The saw blade clamping arrangement of claim 4 wherein the clamp support base defines a first and a second groove that oppose the respective first and second cam surfaces of the release lever and nestingly receive a portion of the first and second spherical locking members in the locked position.

8. The saw blade clamping arrangement of claim 5 wherein the release lever rotates through substantially about forty-five degrees of motion around the pivot axis between the first position and the second position.

9. The saw blade clamping of claim 1 wherein the first spherical locking member is in line with the pivot pin and the first saw blade slot and wherein the second spherical locking member is in line with the pivot pin and the second saw blade slot.

10. A saw blade clamping arrangement for a power tool including a housing, a drive shaft mounted for motion relative to the housing and having a longitudinal drive axis, and a saw blade that is adapted to be releasably interconnected with the drive shaft via the saw blade clamping arrangement for reciprocating motion along a longitudinal axis, the saw blade clamping arrangement comprising:
   a clamp support base having first and second saw blade slots, the clamp support base being adapted to be coupled for movement with the drive shaft;
   a first locking member operatively associated with the clamp support base and movable between a locked position, which is adapted to lock the saw blade in the first saw blade slot, and an unlocked position that permits the saw blade to be input to and withdrawn from the first saw blade slot;
   a second locking member operatively associated with the clamp support base and movable between a locked position, which is adapted to lock the saw blade in the second saw blade slot, and an unlocked position that permits the saw blade to be input to and withdrawn from the second saw blade slot;
   a release lever having a user interaction portion, a first cam surface and a second cam surface, the release lever coupled to the clamp support base for rotational movement about a pivot axis between a first position and a second position to thereby move the first and second locking members, wherein the release lever is movable between a first position, which is associated with placement of the first and second locking members in their locked positions, and a second position, which is associated with placement of the first and second locking members in their unlocked positions; and
   a pivot pin coupled to the clamp support base and defining the pivot axis that the release lever rotates about, wherein the pivot pin is supported by opposing walls of the clamp support base located on opposite sides of the release lever;
   wherein rotation of the release lever from the second position to the first position causes the first cam surface to urge the first locking member at least partially into the first saw blade slot and the second cam surface to concurrently urge the second locking member at least partially into the second saw blade slot.

11. The saw blade clamping arrangement of claim 10 wherein the release lever is unitary.

12. The saw blade clamping arrangement of claim 10 wherein the pivot pin is rotatably coupled to the support base at a location that is at least one of in line with and equidistant from the first and second slots.

13. The saw blade clamping arrangement of claim 10, further comprising a biasing member operably associated with the clamp support base and that urges the release lever into the first position.

14. The saw blade clamping arrangement of claim 13 wherein the biasing member is coupled to the release lever at a location closer to a terminal edge of the release lever and farther from the pivot pin.

15. The saw blade clamping arrangement of claim 10 wherein the first and second cam surfaces directly contact the first and second locking members, respectively, when the release lever is in the first position.

16. The saw blade clamping arrangement of claim 15 wherein the first and second locking members are spherically shaped.

17. The saw blade clamping arrangement of claim 16 wherein the release lever includes first and second concave surfaces that align with and nestingly receive the first and second locking members, respectively, when the release lever is disposed in the second position.

18. The saw blade clamping arrangement of claim 17 wherein the clamp support base defines a first and a second cavity that accommodate the first and second locking members, respectively.

19. The saw blade clamping arrangement of claim 10 wherein the clamp support base defines a first and a second groove that oppose the respective first and second cam surfaces of the release lever.

20. The saw blade clamping arrangement of claim 10 wherein the release lever rotates through substantially about forty-five degrees of motion around the pivot axis between the first position and the second position.

\* \* \* \* \*

UNITED STATES PATENT AND TRADEMARK OFFICE
CERTIFICATE OF CORRECTION

| | | |
|---|---|---|
| PATENT NO. | : 8,555,516 B2 | Page 1 of 1 |
| APPLICATION NO. | : 12/731934 | |
| DATED | : October 15, 2013 | |
| INVENTOR(S) | : Gabriel Da Graca | |

It is certified that error appears in the above-identified patent and that said Letters Patent is hereby corrected as shown below:

In the Claims:

Column 9, line 49 (Claim 3), "claim 2" should be -- claim 1 --.

line 57 (Claim 5), "claim 3" should be -- claim 1 --.

line 65 (Claim 7), "claim 4" should be -- claim 1 --.

Column 10, line 3 (Claim 8), "claim 5" should be -- claim 1 --.

Signed and Sealed this
Seventeenth Day of December, 2013

Margaret A. Focarino
*Commissioner for Patents of the United States Patent and Trademark Office*